United States Patent
Zhu et al.

(10) Patent No.: US 11,646,691 B2
(45) Date of Patent: May 9, 2023

(54) POWER TOOL

(71) Applicant: Nanjing Chervon Industry Co., Ltd., Nanjing (CN)

(72) Inventors: Hong Zhu, Nanjing (CN); Tianxiao Xu, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 0 days.

(21) Appl. No.: 17/462,069

(22) Filed: Aug. 31, 2021

(65) Prior Publication Data

US 2022/0103113 A1 Mar. 31, 2022

(30) Foreign Application Priority Data

Sep. 30, 2020 (CN) .......................... 202011062627.1

(51) Int. Cl.
*H02P 29/024* (2016.01)
*H02P 27/06* (2006.01)

(52) U.S. Cl.
CPC .......... *H02P 29/0241* (2016.02); *H02P 27/06* (2013.01)

(58) Field of Classification Search
CPC .............................. H02P 29/0241; H02P 27/06
See application file for complete search history.

(56) References Cited

U.S. PATENT DOCUMENTS

| | | | | |
|---|---|---|---|---|
| 4,967,054 A * | 10/1990 | Obara | ..................... | B23H 1/022 |
| | | | | 219/69.18 |
| 2007/0040516 A1* | 2/2007 | Chen | .................... | H05B 39/045 |
| | | | | 315/291 |
| 2017/0288585 A1* | 10/2017 | Pant | ....................... | H02P 29/032 |
| 2018/0034388 A1* | 2/2018 | Kawai | ................... | H02H 9/002 |
| 2019/0181660 A1* | 6/2019 | Shibata | ................. | H02J 7/0014 |

* cited by examiner

*Primary Examiner* — Kawing Chan
(74) *Attorney, Agent, or Firm* — Greenberg Traurig, LLP

(57) ABSTRACT

A power tool includes a motor, a rectifier circuit, and a driver circuit. An input terminal of the rectifier circuit is connected to a power module, an output terminal is connected to a direct current bus, an input terminal of the driver circuit is connected to the direct current bus, an output terminal is connected to the motor, and a bus capacitor is connected between a high voltage terminal and a low voltage terminal of the direct current bus. A first protection circuit is connected to the input terminal of the rectifier circuit and a second protection circuit is connected in parallel to two terminals of the bus capacitor. The first protection circuit is configured to absorb an overvoltage signal on an input side of the rectifier circuit. The second protection circuit is configured to absorb an overvoltage signal of the direct current bus.

15 Claims, 8 Drawing Sheets

POWER TOOL

RELATED APPLICATION INFORMATION

This application claims the benefit under 35 U.S.C. § 119(a) of Chinese Patent Application No. CN 202011062627.1, filed on Sep. 30, 2020, which is incorporated by reference in its entirety herein.

BACKGROUND

Since the high voltage brushless machine is directly used by accessing utility power, in an actual use process, a surge voltage signal inevitably occurs due to problems such as grid quality or the power sources actually used by users. For example, in coastal areas and the like, thunderstorms often occur. The thunderstorm may affect grid quality in this area, thereby easily causing a surge voltage in machines. The surge voltage signal can damage electronic components in the high voltage brushless machine, causing the high voltage brushless machine to be unusable.

In the existing art, in order to solve above problems, a power factor corrector (PFC) is generally adopted to absorb the surge voltage in a circuit, but the cost of the power factor corrector is relatively high. In order to reduce cost, a large electrolytic capacitor is often adopted in a circuit to absorb the surge voltage, but the capacitance of the large electrolytic capacitor used is generally about 100 μF, so that the service life of the large electrolytic capacitor is relatively short and the use requirement of tools cannot be met.

SUMMARY

In a first aspect, an example of the present disclosure provides a power tool including a motor, a rectifier circuit and a driver circuit. The motor is configured to drive a functional part in the power tool to rotate; an input terminal of the rectifier circuit is connected to a power module, and an output terminal is connected to a direct current bus; an input terminal of the driver circuit is connected to the direct current bus, and an output terminal is connected to the motor; a bus capacitor is connected between a high voltage terminal and a low voltage terminal of the direct current bus. The power tool further includes a first protection circuit and a second protection circuit. The first protection circuit is connected in parallel to the input terminal of the rectifier circuit, and the first protection circuit is configured to absorb an overvoltage signal on an input side of the rectifier circuit in response to an input voltage of the rectifier circuit being greater than or equal to a first voltage threshold. The second protection circuit is connected to two terminals of the bus capacitor, and the second protection circuit is configured to start operation in response to a bus voltage of the direct current bus being greater than or equal to a second voltage threshold so as to absorb an overvoltage signal of the direct current bus.

In one example, the second protection circuit includes a voltage comparison module, a switching module, and a voltage absorption module. A first input terminal of the voltage comparison module is connected to a first terminal of the bus capacitor, a second input terminal of the voltage comparison module is connected to a reference voltage, and an output terminal of the voltage comparison module is connected to a control terminal of the switching module. A first electrode of the switching module is connected to a first terminal of the voltage absorption module, and a second electrode of the switching module is connected to a set voltage. A second terminal of the voltage absorption module is connected to a second terminal of the bus capacitor.

In one example, the first input terminal of the voltage comparison module is connected to a voltage dividing module, and the voltage dividing module includes an input terminal, a first voltage dividing output terminal, and a second voltage dividing output terminal. The input terminal of the voltage dividing module is connected to the first terminal of the bus capacitor, the first voltage dividing output terminal is connected to the first input terminal of the voltage comparison module, and the second voltage dividing output terminal outputs the set voltage.

In one example, the voltage dividing module includes a first resistor and a second resistor. A first terminal of the first resistor is used as the input terminal of the voltage dividing module, and a second terminal of the first resistor is used as the first voltage dividing output terminal of the voltage dividing module. The second terminal of the first resistor is connected to a first terminal of the second resistor, and a second terminal of the second resistor is used as the second voltage dividing output terminal of the voltage dividing module.

In one example, the voltage absorption module is a first varistor.

In one example, the voltage absorption module is an electrolytic capacitor, an anode of the electrolytic capacitor is used as the second terminal of the voltage absorption module, and a cathode of the electrolytic capacitor is used as the first terminal of the voltage absorption module.

In one example, a current limiter module is further included. The current limiter module is connected in series between a power module and a corresponding input terminal of the rectifier circuit.

In one example, the current limiter module is a negative temperature coefficient thermistor.

In one example, the first protection circuit is a second varistor, the voltage absorption module is a first varistor, and a varistor voltage of the first varistor is less than a varistor voltage of the second varistor.

In a second aspect, an example of the present disclosure further provides another power tool including a motor, a rectifier circuit and a driver circuit. The motor is configured to drive a functional part in the power tool to rotate; an input terminal of the rectifier circuit is connected to a power module, and an output terminal is connected to a direct current bus; an input terminal of the driver circuit is connected to the direct current bus, and an output terminal is connected to the motor. The power tool further includes a first protection circuit and a current limiter module. The first protection circuit is connected to the input terminal of the rectifier circuit, and the first protection circuit is configured to absorb an overvoltage signal on an input side of the rectifier circuit in response to an input voltage of the rectifier circuit being greater than or equal to a first voltage threshold. The current limiter module is connected in series between a power module and a corresponding input terminal of the rectifier circuit, and the current limiter module is configured to suppress a surge current when the power tool is started.

According to the power tool provided in the example of the present disclosure, the first protection circuit is connected on the input side of the rectifier circuit, and the surge voltage in the pre-stage of the rectifier circuit is absorbed by the first protection circuit, thereby preventing the surge voltage from damaging the rectifier circuit, the driver circuit, the motor, and the like in the post-stage. A second protection circuit is connected in parallel at two terminals of a bus capacitor; when the second protection circuit detects that the voltage of the direct current bus exceeds a set second voltage threshold, the second protection circuit starts to operate and absorbs the excessive surge voltage to control the voltage of the direct current bus to quickly return to the normal voltage and protect the driver circuit and electronic devices in the post-stage from being damaged by the surge voltage. In the example, the first protection circuit and the second protection circuit are provided to absorb the surge voltages that may be generated in the pre-stage and the post-stage of the rectifier circuit, respectively, so that the power tool can operate normally even when the power source generates the surge voltage due to voltage fluctuation, thereby improving the adaptability of the power tool to different power sources and reliability of the power tool.

DETAILED DESCRIPTION

Figure 1:
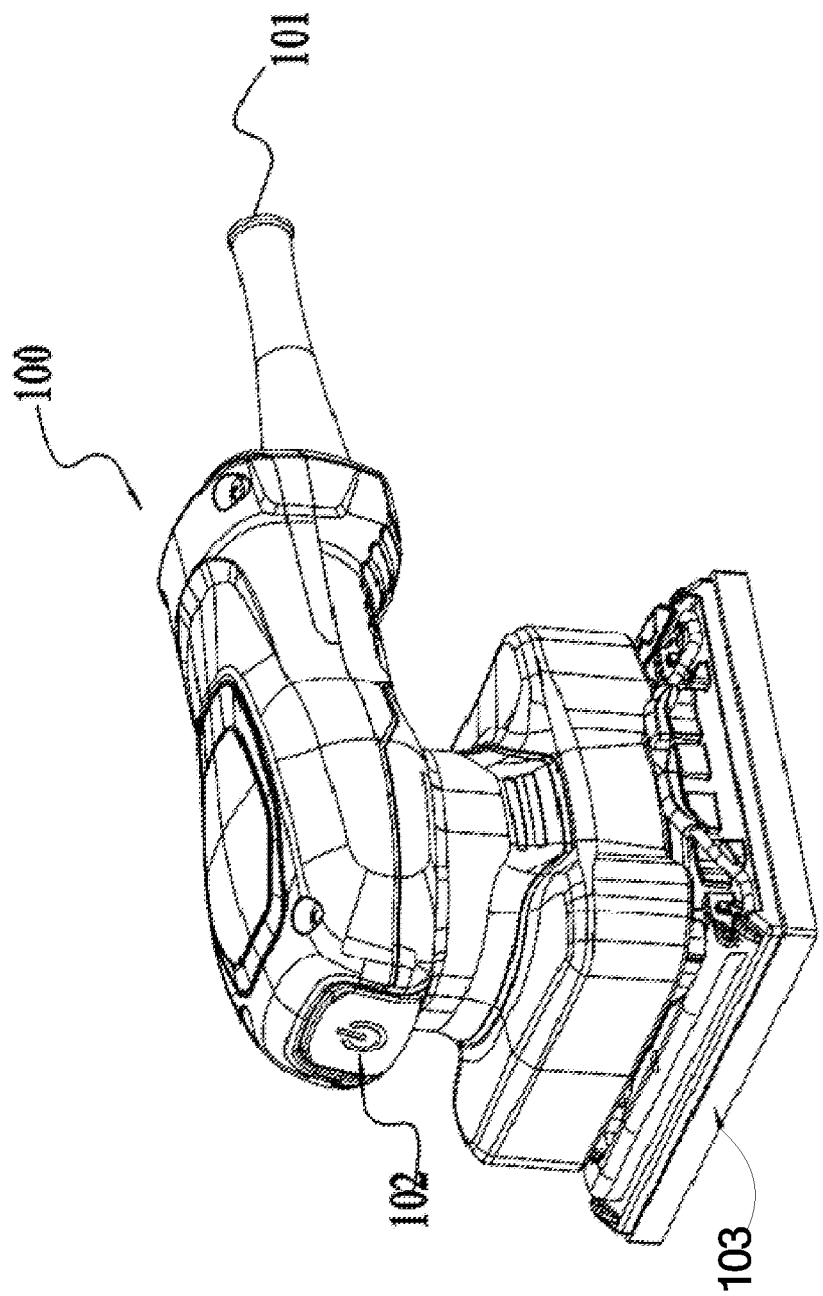
FIG. 1 is a structure view of a power tool according to an example of the present disclosure.

The present disclosure is further described hereinafter in detail in conjunction with drawings and examples. It is to be understood that the examples described herein are merely intended to explain the present disclosure and not to limit the present disclosure. Additionally, it is to be noted that for ease of description, merely part, not all, of the structures related to the present disclosure are illustrated in the drawings.

FIG. 1 is a structure view of a power tool 100 according to an example. The power tool 100 is not limited to a drill, a grinding machine, a screwdriver, a sander machine, and the like. Power tools driven by brushless motors can all adopt the technical solution provided in the example. Referring to FIG. 1, the power tool 100 has an alternating current plug 101 for connecting utility power through the alternating current plug 101. The power tool 100 has a switching device 102, and the switching device 102 is used for controlling on/off of the power tool 100 so as to start or turn off the power tool 100.

Figure 2:
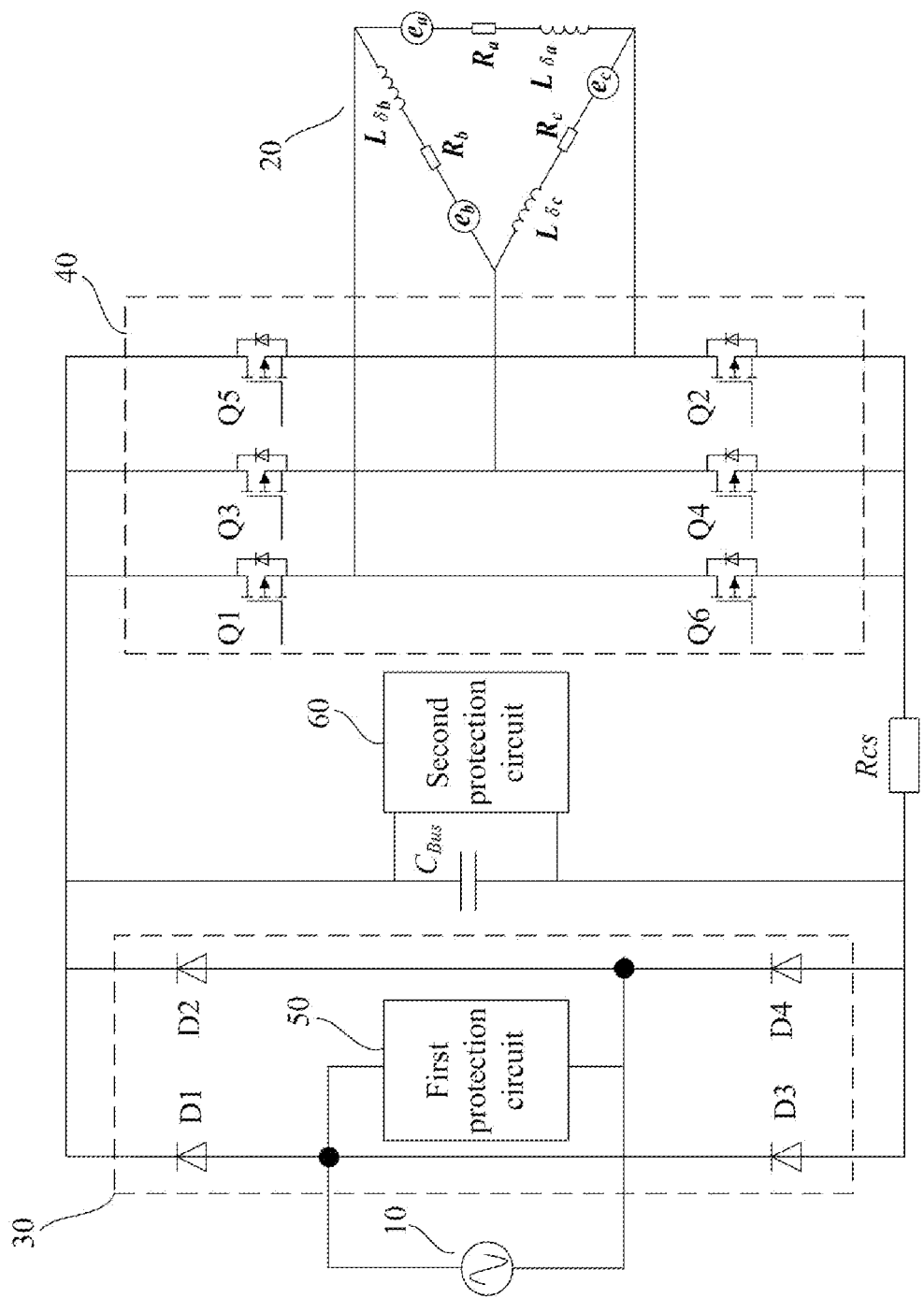
FIG. 2 is a circuit structure diagram of a power tool according to an example of the present disclosure.

FIG. 2 is a circuit structure diagram of the power tool 100 according to an example. Referring to FIGS. 1 and 2, the power tool 100 specifically includes a power module 10, a motor 20, a rectifier circuit 30, a driver circuit 40, a motor controller, a first protection circuit 50 and a second protection circuit 60.

The power module 10 is used for accessing alternating current so as to supply power to the motor 20. In some examples, the power module 10 includes an alternating current plug 101 and a peripheral circuit electrically connected to the alternating current plug 101. The alternating current plug 101 is plugged into an alternating current socket so as to access utility power, thereby providing an electrical energy source for the motor 20. In another example, the power module 10 includes structures in other forms and peripheral circuits capable of accessing alternating current, for example, an alternating current plug 101 is accessed to a portable substation to access alternating current, and the like. It is to be noted that the power module 10 merely needs to be able to access alternating current, and neither the specific structure nor the form is limited herein. The value range of the alternating current that the power module 10 can access may be 110V to 130V or 210V to 230V.

The motor 20 includes a stator winding and a rotor. In some examples, the motor 20 is a three-phase brushless motor 20 that includes a rotor having a permanent magnet and three-phase stator windings U, V and W that are electronically commutated. In some examples, star connection is adopted between the three-phase stator windings U, V and W, and in other examples, corner connection is adopted between the three-phase stator windings U, V and W. However, it has to be understood that other types of brushless motors are also within the scope of the present disclosure. The brushless motor may include less than or more than three phases. In one example, the motor 20 in the example is not provided with a Hall sensor, and the motor controller detects the rotor position by sending a positioning signal to the motor 20, thereby achieving rotation control of the motor 20. It is to be noted that the motor 20 in FIG. 2 is an exemplary equivalent circuit of a three-phase motor for describing the connection relationship between each phase winding of the motor and the driver circuit.

The rectifier circuit 30 is used for converting alternating current into direct current as output. In some examples, the rectifier circuit 30 includes four rectifier circuit bridges D1, D2, D3, and D4. A direct current bus is connected to an output terminal of the rectifier circuit 30, and a bus capacitor $C_{Bus}$ is connected in series between the high voltage side and the low voltage side of the direct current bus.

In some examples, the output terminal of the rectifier circuit 30 is also connected to a filter capacitor. The filter capacitor is used for filtering a pulsed direct current from the rectifier circuit 30. The filter capacitor is connected in series between the rectifier circuit 30 and the driver circuit 40. The pulsed direct current output from the rectifier circuit 30 is filtered by the filter capacitor and converted into a smooth direct current as output so as to reduce harmonic interference in the pulsed direct current.

The switching device 102 may be disposed between the power module 10 and the driver circuit 40. The switching device 102 is used as a trigger switch for the power tool 100. Users press the switching device 102 to position the switching device 102 in the ON position, the motor controller receives an electrical signal from the power module 10, and the motor 20 is powered on. The users press the switching device 102 to be in the OFF position to cut off the electrical connection between the motor controller and the power module 10, and the motor 20 is powered off.

In some examples, the motor controller controls the on and off state of the driver circuit 40 through a driver chip. The driver chip is connected in series between the motor controller and the driver circuit 40 and controls an electronic switch in the driver circuit 40 to be in an on or off state according to a control signal from the motor controller. In some examples, the control signal from the motor controller is a pulse-width modulation (PWM) control signal. In this example, the driver chip is shown to be separated from the motor controller. In other examples, the driver chip and the motor controller may be integrated as a whole.

The driver circuit 40 is used for driving the motor 20 and is electrically connected to the direct current bus. The input terminal of the driver circuit 40 receives a pulsating direct current voltage from the direct current bus and distributes the power of the pulsating direct current voltage to each phase winding on the stator of the motor 20 according to a certain logic relationship under the driving of a drive signal output from the driver chip so as to start the motor 20 and generate continuous torque. Specifically, the driver circuit 40 includes a plurality of electronic switches. In some examples, the electronic switch includes a field-effect transistor (FET), in other examples, the electronic switch includes an insulated-gate bipolar transistor (IGBT), and the like. In some examples, the driver circuit 40 is a three-phase full-bridge circuit. The driver circuit 40 includes three drive switches Q1, Q3 and Q5 provided as upper bridge leg switches and three drive switches Q2, Q4 and Q6 provided as lower bridge leg switches.

Three drive switches Q1, Q3 and Q5 as upper bridge leg switches are provided between the power supply line and coils for all phases of the motor 20, respectively. Three switch components Q4, Q6 and Q2 as lower bridge leg switches are provided between coils for all phases of the motor 20 and the ground wire, respectively.

Each gate terminal of the six drive switches Q1 to Q6 are electrically connected to the motor controller, and each drain or source of the six drive switches is connected to a stator winding of the motor 20. The drive switches Q1 to Q6 switch on and off at a certain frequency in accordance with the control signal output from the motor controller, thereby changing the power state of the power module 10 loaded on the windings of the motor 20.

The driver circuit 40 is a circuit for rotationally driving the motor 20 by switching the energized state of each phase winding of the motor 20 and controlling the energized current of each phase winding. The turn-on sequence and time of each phase winding depends on the position of the rotor. In order to make the motor 20 rotate, the driver circuit 40 has a plurality of driving states. Under a driving state, the stator windings of the motor 20 can generate a magnetic field, and the motor controller outputs a control signal based on different rotor positions so as to control the driver circuit 40 to switch the driving state. Therefore, the magnetic field generated by the stator windings is rotated to drive the rotor to rotate, then achieving the driving of the motor 20.

The power tool 100 further includes a functional part 103. The functional part 103 is used for achieving the function of the power tool 100, and the functional part 103 is driven by the motor 20 to operate. For different power tools, function parts are different. For example, for a sander, a functional part is a base plate capable of holding an accessory such as sandpaper and is used for achieving a polishing function.

A first protection circuit 50 is connected to an input terminal of the rectifier circuit 30, and the first protection circuit 50 is configured to absorb an overvoltage signal on an input side of the rectifier circuit 30 in response to an input voltage of the rectifier circuit 30 being greater than or equal to a first voltage threshold.

A second protection circuit 60 is connected in parallel to two terminals of the bus capacitor $C_{Bus}$, and the second protection circuit 60 is configured to start operation in response to a bus voltage of the direct current bus being greater than or equal to a second voltage threshold so as to absorb an overvoltage signal of the direct current bus.

The first protection circuit 50 is provided on an input side of the rectifier circuit 30, so that when a surge voltage occurs on the input side of the rectifier circuit 30, the first protection circuit 50 can absorb the surge voltage so as to reduce the voltage on the input side of the rectifier circuit 30 to a normal voltage. Therefore, the rectifier circuit 30, the driver circuit 40, the motor 20 and the like in the post-stage can be prevented from being damaged by the surge voltage.

The second protection circuit 60 is connected in parallel to two terminals of the bus capacitor $C_{Bus}$, and the second protection circuit 60 has the functions of voltage detection and self-starting. Specifically, when the bus voltage of the direct current bus is a normal voltage, the second protection circuit 60 does not operate, and the direct current bus normally supplies power to the driver circuit 40 and other devices, so that normal operation of the power tool 100 is not affected. When the bus voltage of the direct current bus exceeds the second voltage threshold, the second protection circuit 60 starts to operate, and at this time, the surge voltage on the direct current bus is absorbed by the second protection circuit 60, so that the bus voltage is rapidly reduced to a normal voltage, and the damaging effect of the surge voltage on the electronic devices such as the driver circuit 40 is avoided.

According to the power tool 100 provided in the example, the first protection circuit 50 is connected on the input side of the rectifier circuit 30, and the surge voltage in the pre-stage of the rectifier circuit 30 is absorbed by the first protection circuit 50, thereby preventing the surge voltage from damaging the rectifier circuit 30 and the driver circuit 40, the motor 20, and the like in the post-stage. The second protection circuit 60 is connected in parallel to two terminals of the bus capacitor $C_{Bus}$, when the second protection circuit 60 detects that the voltage of the direct current bus exceeds a set second voltage threshold, the second protection circuit 60 starts to operate, absorbs the excessive surge voltage to control the voltage of the direct current bus to quickly return to a normal voltage, and protects the driver circuit 40 and electronic devices in the post-stage from being damaged by the surge voltage. In the example, the first protection circuit 50 and the second protection circuit 60 are provided to absorb the surge voltages that may be generated in the pre-stage and post-stage of the rectifier circuit 30, respectively, so that the power tool 100 can operate normally even when the surge voltage is generated due to voltage fluctuation of the power source, thereby improving the adaptability of the power tool 100 to different power sources and reliability of the power tool 100.

Figure 3:
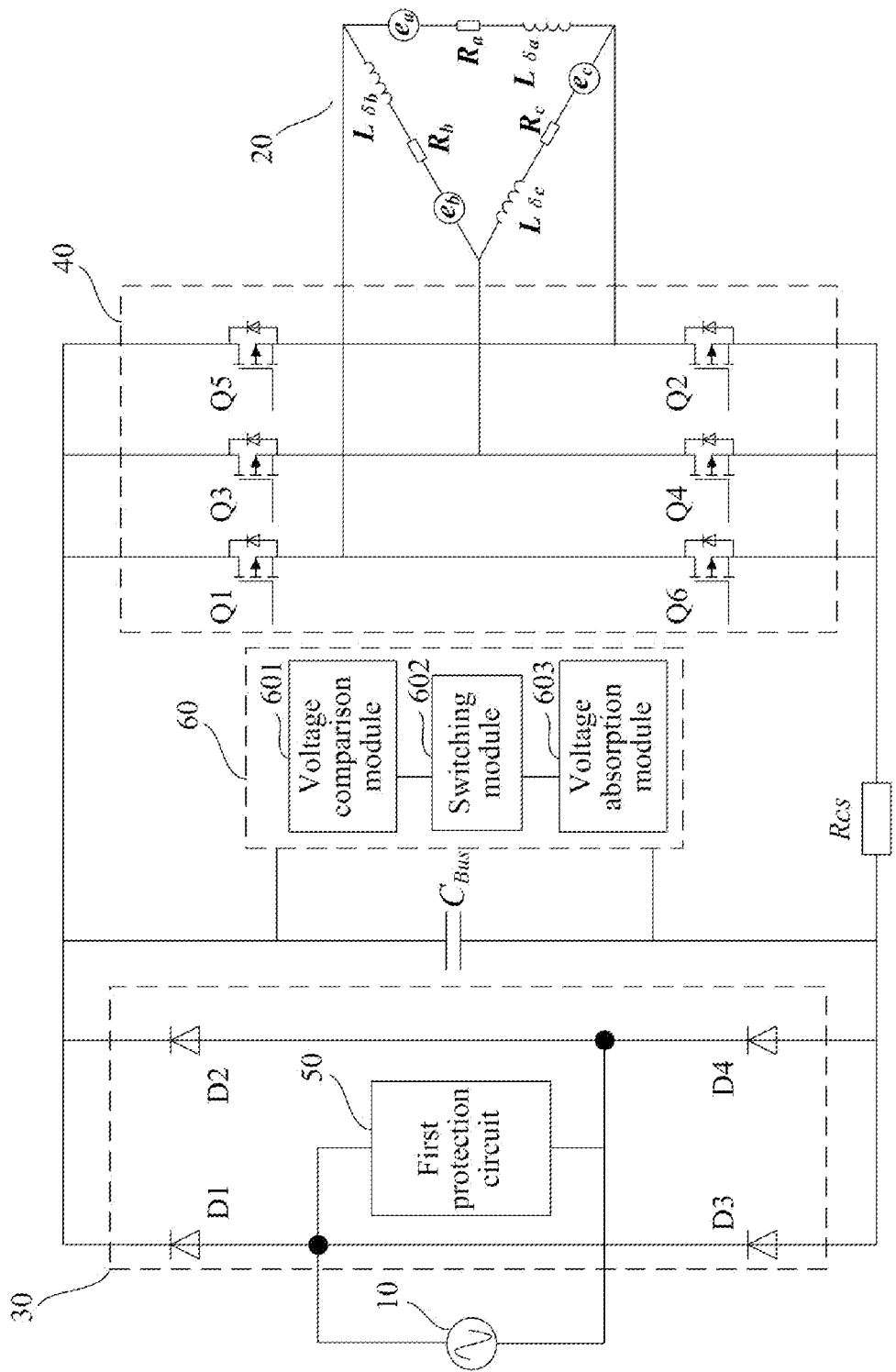
FIG. 3 is a circuit structure diagram of another power tool according to an example of the present disclosure.

In one example, FIG. 3 is a circuit structure diagram of another power tool according to an example of the present disclosure. Referring to FIG. 3, the second protection circuit 60 includes a voltage comparison module 601, a switching module 602, and a voltage absorption module 603.

A first input terminal of the voltage comparison module 601 is connected to a first terminal of the bus capacitor $C_{Bus}$, a second input terminal of the voltage comparison module 601 is connected to a reference voltage, and an output terminal of the voltage comparison module 601 is connected to a control terminal of the switching module 602.

A first electrode of the switching module 602 is connected to a first terminal of the voltage absorption module 603, and a second electrode of the switching module 602 is connected to a set voltage.

A second terminal of the voltage absorption module 603 is connected to a second terminal of the bus capacitor $C_{Bus}$.

The voltage comparison module 601 is used for collecting the bus voltage of the direct current bus and determining the bus voltage so as to detect whether the direct current bus voltage exceeds the set second voltage threshold, thereby achieving the function of detecting the bus voltage. For example, the voltage comparison module 601 is constructed through selection of an appropriate voltage comparator and adjustment of a reference voltage of the voltage comparator. Therefore, the result of a comparison between the input voltage of the first input terminal of the voltage comparison module 601 and the reference voltage can represent the magnitude relationship between the bus voltage and the second voltage threshold, thus achieving that whether the bus voltage of the direct current bus is normal or not is automatically detected by the voltage comparison module 601.

The output terminal of the voltage comparison module 601 is connected to the switching module 602, so that when the voltage comparison module 601 detects that the voltage of the direct current bus exceeds the second voltage threshold, the switching module 602 is controlled to be in an on state, thereby achieving that the second protection circuit 60 self-starts when the direct current bus has a surge voltage.

The first terminal of the voltage absorption module 603 is connected to the first electrode of the switching module 602, and the second terminal of the voltage absorption module 603 is connected to the second terminal of the bus capacitor $C_{Bus}$, so that the voltage absorption module 603 and the switching module 602 form a series connection structure. In this manner, when the switching module 602 is turned on, the voltage absorption module 603 is accessed between the high voltage side and the low voltage side of the direct current bus, and the voltage absorption module 603 starts to absorb the surge voltage on the direct current bus so as to quickly make the bus voltage return to the normal voltage.

Exemplarily, the first input terminal of the voltage comparison module 601 is a non-inverting input terminal, and the second input terminal of the voltage comparison module 601 is an inverting input terminal. When the voltage of the non-inverting input terminal exceeds the reference voltage, that is, the bus voltage of the direct current bus is greater than the second voltage threshold, the output terminal of the voltage comparison module 601 outputs a high level, and the switching module 602 is electrically conductive, so that the voltage absorption module 603 starts to operate to absorb the overvoltage signal on the direct current bus.

Figure 4:
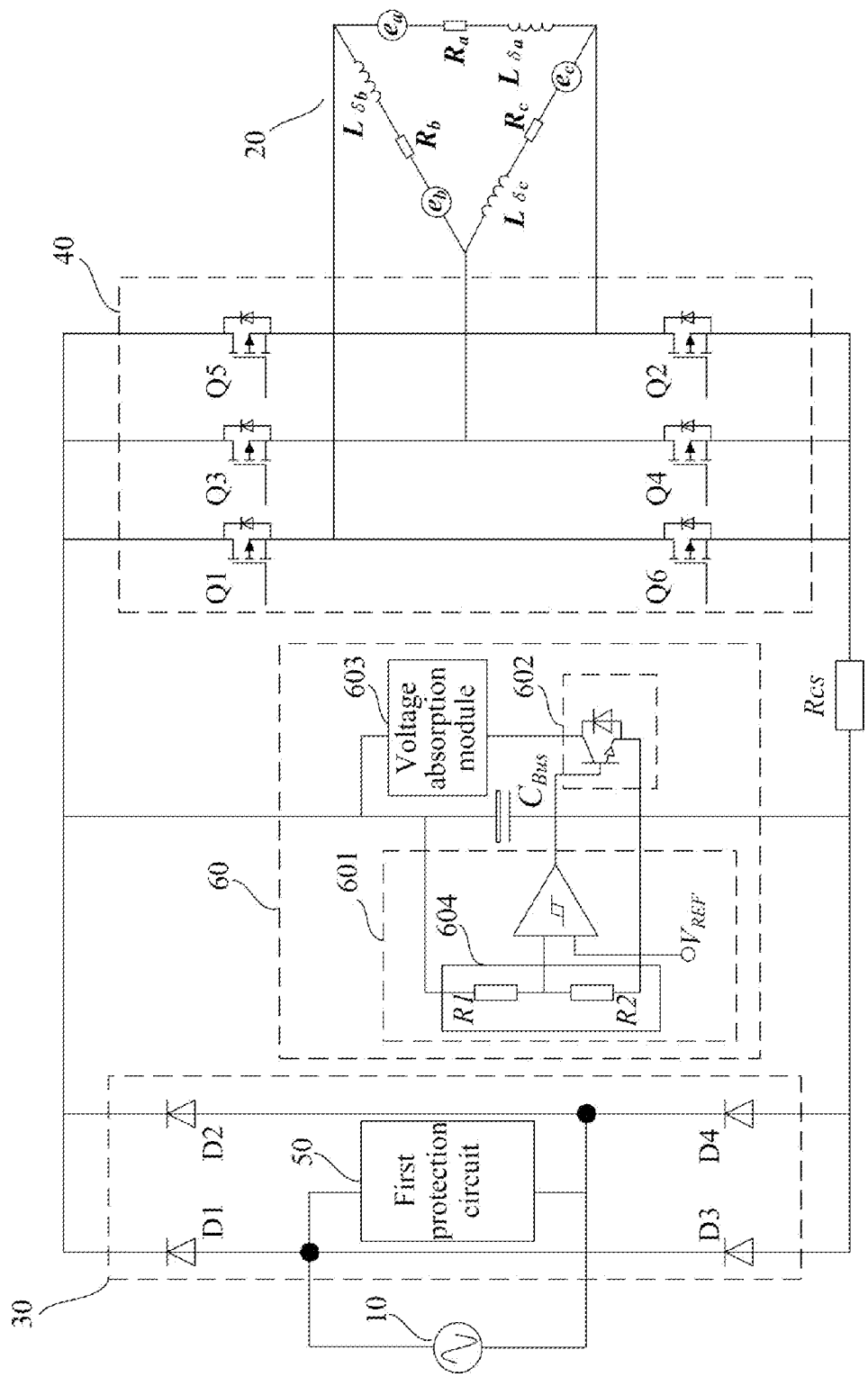
FIG. 4 is a circuit structure diagram of another power tool according to an example of the present disclosure.

In one example, FIG. 4 is a circuit structure diagram of another power tool according to an example of the present disclosure. On the basis of the above examples, refer to FIG. 4. The first input terminal of the voltage comparison module 601 is connected to a voltage dividing module 604, and the voltage dividing module 604 includes an input terminal, a first voltage dividing output terminal, and a second voltage dividing output terminal.

An input terminal of the voltage dividing module 604 is connected to the first terminal of the bus capacitor $C_{Bus}$, the first voltage dividing output terminal is connected to the first input terminal of the voltage comparison module 601, and the second voltage dividing output terminal outputs the set voltage.

The first input terminal of the voltage comparison module 601 is connected to the voltage dividing module 604, so that the bus voltage is divided to output a voltage detection signal corresponding to the input characteristic of the voltage comparison module 601. Specifically, the voltage dividing module 604 divides the bus voltage and then outputs a first voltage dividing signal and a second voltage dividing signal. The first voltage dividing signal is output by the first voltage dividing output terminal, and the second voltage dividing signal is output by the second voltage dividing output terminal. The magnitude of the first voltage dividing signal output from the voltage dividing module 604 and the reference voltage of the voltage comparison module 601 is adjusted, so that the result of a comparison between the first voltage dividing signal and the reference voltage can represent the magnitude relationship between the bus voltage of the direct current bus and the second voltage threshold. Thus, the voltage comparison module 601 determines whether the bus voltage exceeds the second voltage threshold based on the result of the comparison between the first voltage dividing signal and the reference voltage signal. When the first voltage dividing signal exceeds the reference voltage, a high-level signal is output to control the switching module 602 to turn on so that the voltage absorption module 603 starts to operate.

The second voltage dividing signal output from the second voltage dividing output terminal of the voltage dividing module 604 is used for supplying power to the switching module 602. Thus, a supply signal is not needed to be additionally configured to supply power to the switching module 602, and thereby the circuit structure is simplified.

In one example, on the basis of the above examples, refer to FIG. 4. The voltage dividing module 604 includes a first resistor R1 and a second resistor R2.

A first terminal of the first resistor R1 is used as the input terminal of the voltage dividing module 604, and a second terminal of the first resistor R1 is used as a first voltage dividing output terminal of the voltage dividing module 604.

The second terminal of the first resistor R1 is connected to a first terminal of the second resistor R2, and a second terminal of the second resistor R2 is used as the second voltage dividing output terminal of the voltage dividing module 604.

The first resistor R1 and the second resistor R2 form a resistive voltage divider network. The first voltage dividing signal is output after the first resistor R1 divides a voltage, and the first voltage dividing signal is used as a voltage detection signal of the voltage comparison module 601 for the direct current bus.

The second voltage dividing signal is output after the second resistor R2 divides the voltage. The second voltage dividing signal is the set voltage, and the set voltage supplies power to the switching module 602.

With the resistive voltage divider network provided in the example, the first resistor R1 and the second resistor R2 are adjusted, so that the voltage dividing module 604 can output a voltage detection signal that meets the requirements and output a power supply signal matching the switching module 602, achieving the normal operation of the second protection circuit 60.

Figure 5:
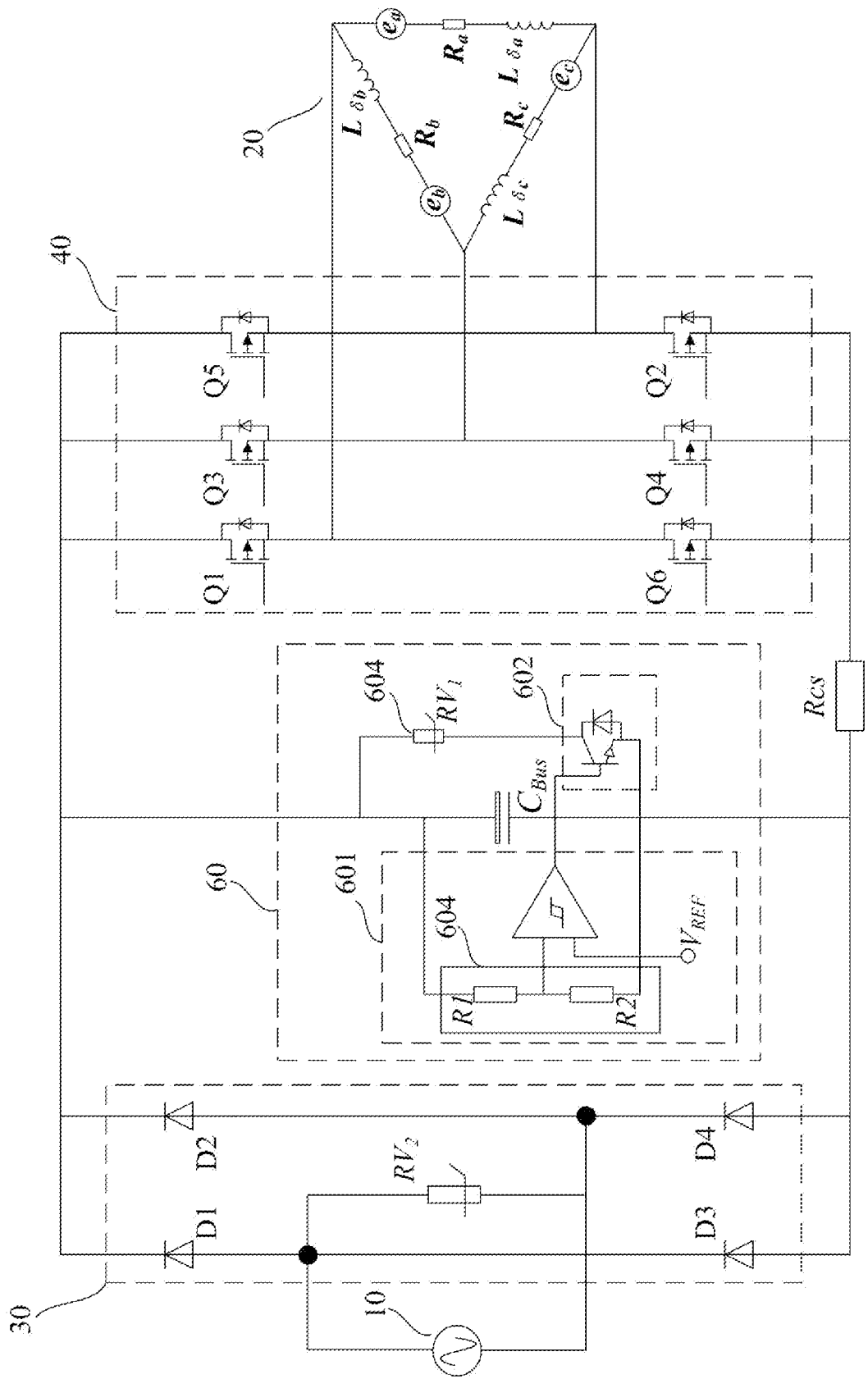
FIG. 5 is a circuit structure diagram of another power tool according to an example of the present disclosure.

In one example, FIG. 5 is a circuit structure diagram of another power tool according to an example of the present disclosure. On the basis of the above examples, refer to FIG. 5. The voltage absorption module 603 is a first varistor RV1.

According to the operating characteristics of the varistor, the current flowing through the varistor is extremely small when the voltage applied to the varistor is lower than the varistor voltage of the varistor. In this case, the varistor is equivalent to a resistor with infinite resistance. That is, when the voltage applied to the varistor is lower than the varistor voltage, the varistor is equivalent to a switch in the off state.

When the voltage applied to the varistor exceeds the varistor voltage, the current flowing through the varistor rapidly rises; in this case, the varistor is equivalent to a resistor with infinitesimal resistance. That is, when the voltage applied to the varistor is higher than the varistor voltage, the varistor is equivalent to a switch in the on state.

Specifically, in the example, after the switching module 602 is turned on, the voltage across the first varistor RV1 is higher than the varistor voltage of the first varistor RV1. In this case, the first varistor RV1 starts to operate and absorbs the overvoltage to quickly reduce the voltage of the direct current bus to the normal voltage, thereby achieving the protection of circuits in the post-stage.

Exemplarily, the first varistor RV1 may be at a level of 391V or less, that is, when the voltage across the first varistor RV1 is larger than 391V, the first varistor RV1 is turned on, and when the voltage across the first varistor RV1 is less than 391V, the first varistor RV1 is not turned on.

Of course, the first varistor RV1 needs to be specifically selected according to the device characteristics of the rectifier circuit 30 and the driver circuit 40 so that the first varistor RV1 can protect the driver circuit 40 and other electronic devices powered by the direct current bus.

In the example, the first varistor RV1 is provided as the voltage absorption module 603 of the second protection circuit 60, and the surge voltage is absorbed by the first varistor RV1. Because the first varistor RV1 has a relatively high impedance, the current flowing through the first varistor RV1 is relatively small, that is, the current flowing through the switching module 602 is relatively small, so that more types of switch transistors can be selected to construct the switching module 602. Therefore, the selection range of types of switch transistors is widened, the second protection circuit 60 has better practicability, and because of the low cost of varistors, the development cost of tools is reduced to a certain extent.

In one example, on the basis of the above example, reference will continue to be made to FIG. 5. The first protection circuit 50 is a second varistor RV2, the voltage absorption module 603 is the first varistor RV1, and the varistor voltage of the first varistor RV1 is less than the varistor voltage of the second varistor RV2.

Similar to the above mechanism of action of the first varistor RV1, the second varistor RV2 is provided as the first protection circuit 50, so that absorbing the overvoltage signal on the input side of the rectifier circuit 30 can be achieved to protect the rectifier circuit 30 and other circuits in the post-stage.

Exemplarily, the second varistor RV2 may be at a level of 471V or more, that is, when the voltage across the second varistor RV2 is larger than 471V, the second varistor RV2 is turned on, and when the voltage across the second varistor RV2 is less than 471V, the second varistor RV2 is not turned on.

Of course, the second varistor RV2 needs to be specifically selected according to the input characteristics of the rectifier circuit 30 so that the second varistor RV2 can match the rectifier circuit 30 so as to protect the rectifier circuit 30.

As can be seen from the above, the first voltage threshold is a minimum voltage value when the second varistor RV2 is turned on, that is, the first voltage threshold is a fixed value after the RV2 selection is determined. The second voltage threshold is a minimum voltage value for controlling the switching module 602 to turn on and can be adaptively adjusted as required.

Figure 6:
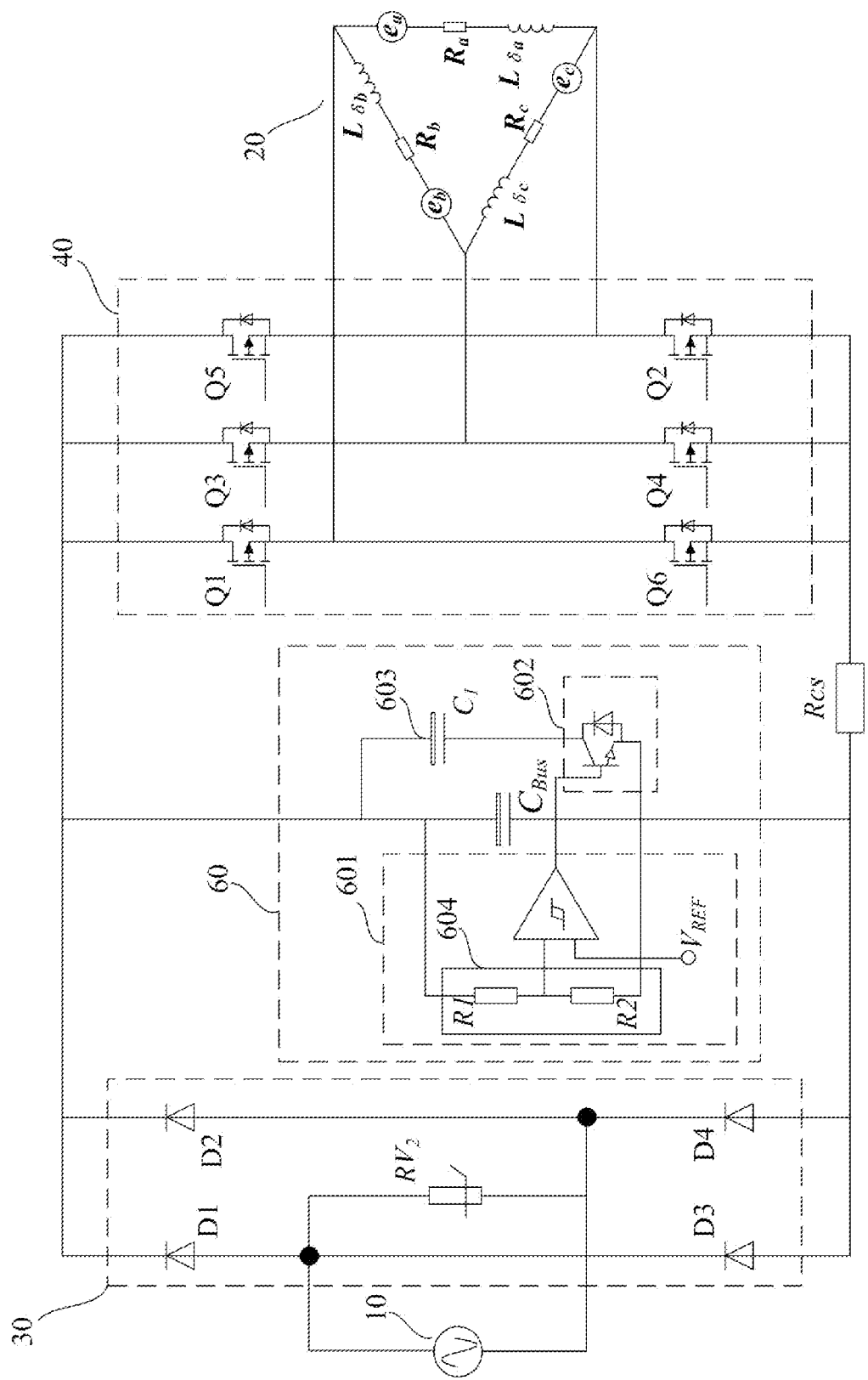
FIG. 6 is a circuit structure diagram of another power tool according to an example of the present disclosure.

In one example, FIG. 6 is a circuit structure diagram of another power tool according to an example of the present disclosure. On the basis of the above examples, refer to FIG. 6. The voltage absorption module 603 is an electrolytic capacitor C1, an anode of the electrolytic capacitor C1 is used as the second terminal of the voltage absorption module 603, and a cathode of the electrolytic capacitor C1 is used as the first terminal of the voltage absorption module 603.

When the bus voltage of the direct current bus exceeds the set second voltage threshold, the switching module 602 is turned on, and the electrolytic capacitor C1 starts to access and absorb the surge voltage. When the bus voltage returns to normal, the switching module 602 is turned off so that the electrolytic capacitor C1 is no longer involved in operation.

It is to be noted that the capacitance of the electrolytic capacitor C1 in the example merely needs to be greater than the capacitance of the bus capacitor $C_{Bus}$, so that the electrolytic capacitor C1 can absorb the surge voltage. Generally, the capacitance of the electrolytic capacitor C1 adopted is selected between 15 μF and 22 μF.

In the example, the electrolytic capacitor C1 is used as the voltage absorption module 603 of the second protection circuit 60. When the bus voltage exceeds the set second voltage threshold, the electrolytic capacitor C1 starts to absorb the surge voltage. In the example, the electrolytic capacitor C1 is used as the voltage absorption module 603, the shunt speed can be made faster, and thus, the voltage of the direct current bus can be quickly reduced to the normal voltage. Further, since the electrolytic capacitor C1 absorbs the surge voltage only when the switching module is turned on, and the electrolytic capacitor C1 has a lower capacitance than the related high-capacitance electrolytic capacitor, the service life of the electrolytic capacitor C1 is not affected.

Figure 7:
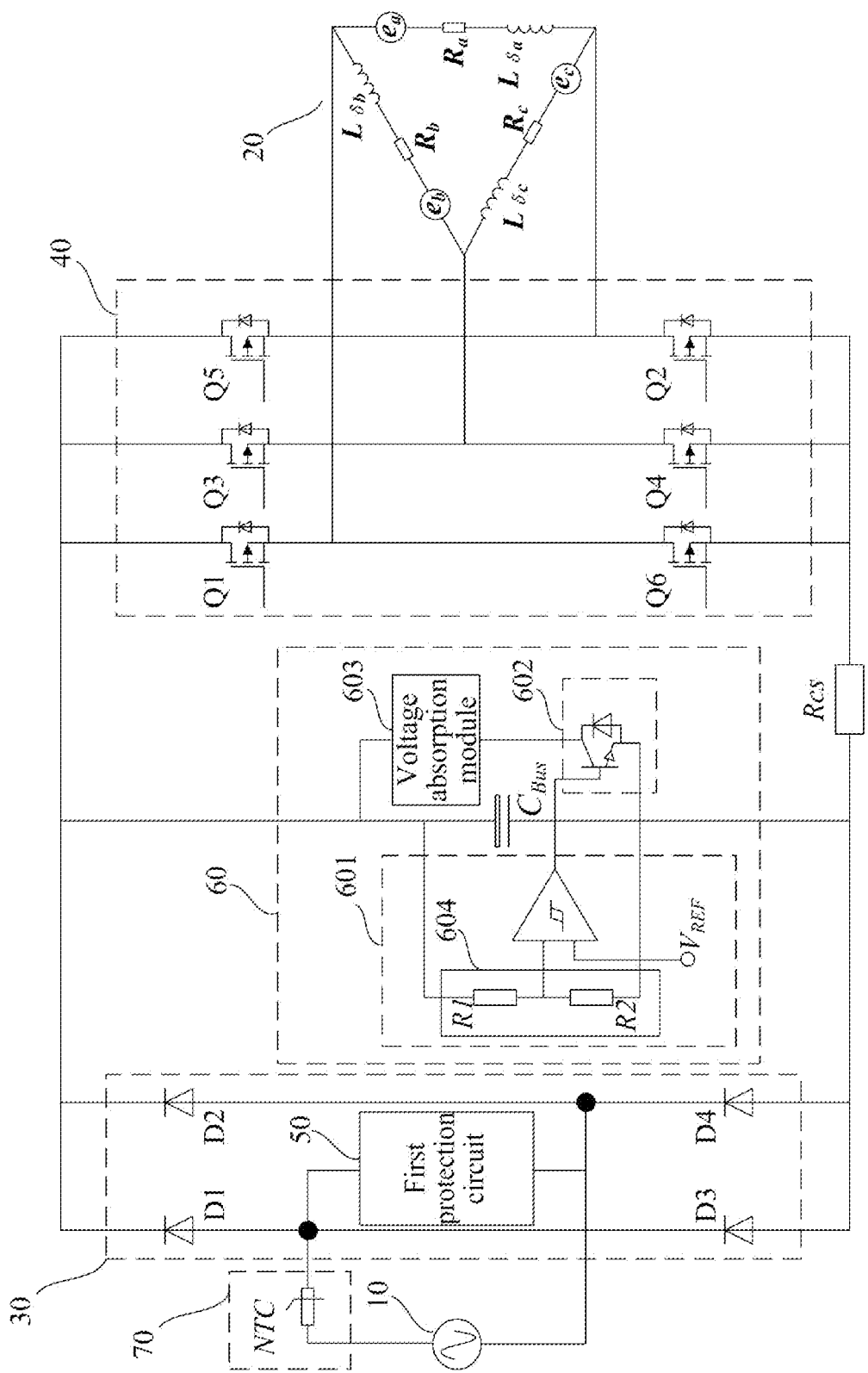
FIG. 7 is a circuit structure diagram of another power tool according to an example of the present disclosure.

In one example, FIG. 7 is a circuit structure diagram of another power tool according to an example. Referring to FIG. 7, the power tool further includes a current limiter module 70, and the current limiter module 70 is connected in series between the power module 10 and a corresponding input terminal of the rectifier circuit 30.

The current limiter module 70 is connected in series between the power module and the corresponding input terminal of the rectifier circuit 30, and the impedance on lines is increased by the current limiter module 70. In this manner, the surge voltage is suppressed by division of the voltage through the current limiter module 70, thereby preventing the surge voltage from entering into the rectifier circuit 30.

In one example, in one example, a negative temperature coefficient (NTC) thermistor is adopted as the current limiter module 70.

Since the resistance value of the NTC thermistor decreases as the temperature increases, the NTC thermistor has a relatively high impedance when the power tool is started, so that the surge voltage generated at the start-up can be suppressed. However, after the power tool is started, since the resistance value of the NTC thermistor gradually decreases, the dividing voltage of the NTC thermistor is very small, and therefore, normal operation of the power tool is not affected.

In other examples, the power tool may also be provided to absorb a surge signal merely by the cooperation of the first protection circuit 50 and the current limiter module 70. Specifically, the power tool includes a motor 20, a rectifier circuit 30 and a driver circuit 40. The motor 20 is used for driving a functional part in the power tool to rotate; an input terminal of the rectifier circuit 30 is connected to a power module 10, and an output terminal of the rectifier circuit 30 is connected to a direct current bus; an input terminal of the driver circuit 40 is connected to the direct current bus, and an output terminal of the driver circuit 40 is connected to the motor 20.

The power tool further includes a first protection circuit 50 and a current limiter module 70.

The first protection circuit 50 is connected in parallel to the input terminal of the rectifier circuit 30, and the first protection circuit 50 is configured to absorb an overvoltage signal on an input side of the rectifier circuit 30 in response to an input voltage of the rectifier circuit 30 being greater than or equal to a first voltage threshold.

The current limiter module 70 is connected in series between a power module and a corresponding input terminal of the rectifier circuit 30, and the current limiter module 70 is configured to suppress a surge current when the power tool is started.

The current limiter module 70 is connected in series and the first protection circuit 50 is connected in parallel merely at a front terminal of the rectifier circuit 30. The current limiter module 70 and the first protection circuit 50 cooperate to absorb a surge signal on lines, thereby preventing the surge signal from entering into the rectifier circuit 30 to achieve the overvoltage protection for the rectifier circuit 30, the driver circuit 40, and other devices on the circuit board.

In one example, the first protection circuit 50 is a varistor and the current limiter module 70 is an NTC thermistor. For the principle of suppressing the surge signal by the varistor and the NTC thermistor, refer to the description of the above examples. Repetition is not made in the example.

In the example, the surge signal is suppressed by the current limiter module 70 and the first protection circuit 50 merely in the pre-stage of the rectifier circuit 30, so that the surge signal is absorbed in the pre-stage of the rectifier circuit 30, thereby achieving the overvoltage protection for the power tool. The example has the advantages of simple structure and convenience in implementation.

Figure 8:
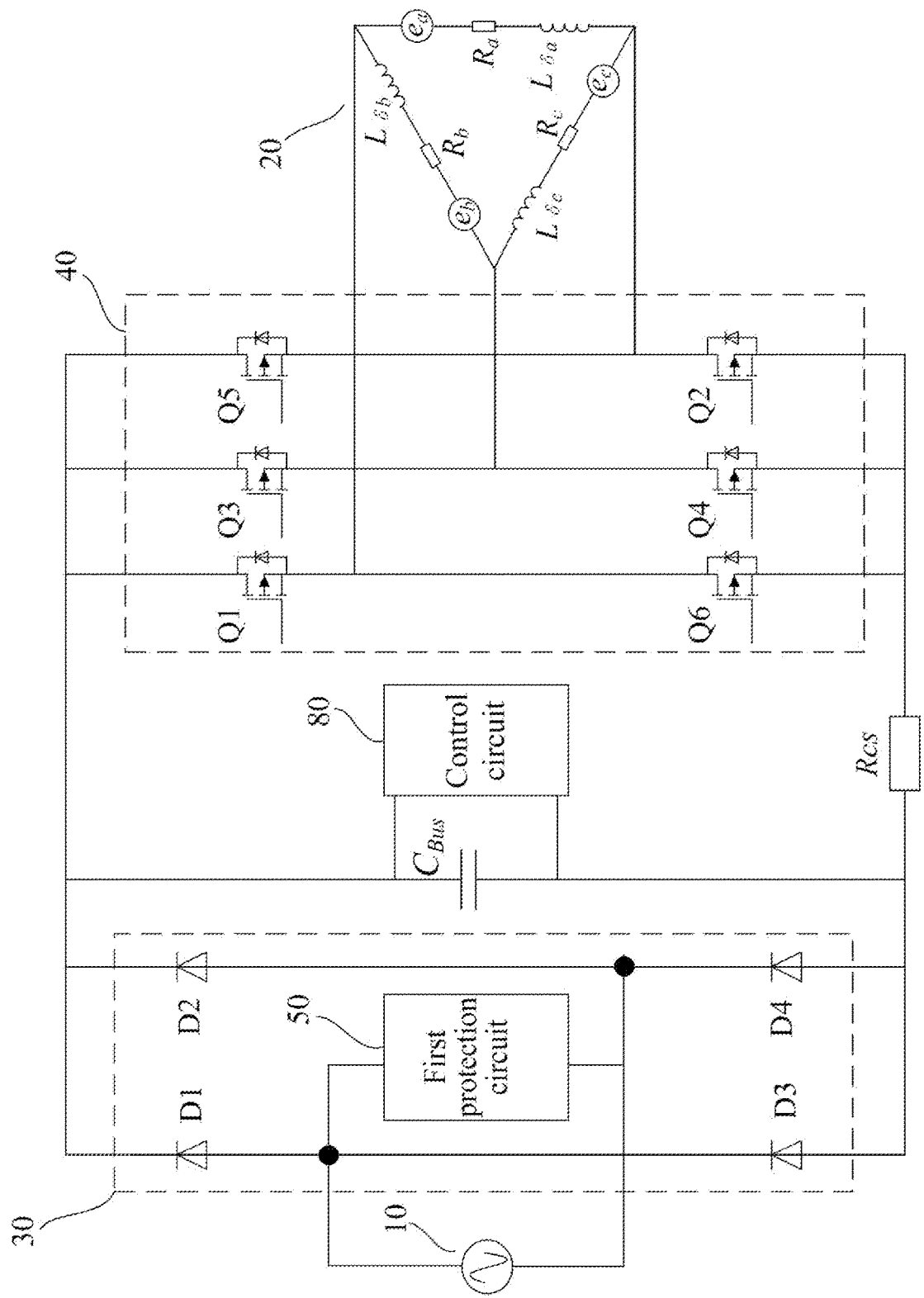
FIG. 8 is a circuit structure diagram of another power tool according to an example of the present disclosure.

In one example, FIG. 8 is a circuit structure diagram of another power tool according to an example of the present disclosure. On the basis of the above examples, refer to FIG. 8. The power tool includes a motor 20, a rectifier circuit 30 and a driver circuit 40. The motor 20 is configured to drive a functional part in the power tool to rotate; an input terminal of the rectifier circuit 30 is connected to a power module 10, and an output terminal of the rectifier circuit 30 is connected to a direct current bus; an input terminal of the driver circuit 40 is connected to the direct current bus, and an output terminal of the driver circuit 40 is connected to the motor 20. The power tool further includes a first protection circuit 50 and a control circuit 80.

The first protection circuit 50 is connected in parallel to the input terminal of the rectifier circuit 30, and the first protection circuit 50 is configured to absorb an overvoltage signal on an input side of the rectifier circuit 30 in response to an input voltage of the rectifier circuit 30 being greater than or equal to a first voltage threshold.

The control circuit 80 is connected to the direct current bus, and the control circuit 80 is configured to turn off the driver circuit 40 in response to the bus voltage of the direct current bus being greater than or equal to a third voltage threshold.

The first protection circuit 50 may be, for example, a varistor.

The control circuit 80 is connected to the direct current bus so as to monitor the bus voltage. In an example, the control circuit 80 is connected to the bus capacitor $C_{Bus}$ so as to turn off the driver circuit 40 when it is detected that the voltage value of the bus capacitor $C_{Bus}$ reaches a set threshold.

In one example, a voltage comparator and a control chip (or a driver chip) are built into the control circuit 80. The voltage comparator detects whether the bus voltage exceeds a set third voltage threshold by comparing the bus voltage of the direct current bus collected with a set reference voltage and outputs an overvoltage signal to the control chip when determining the bus voltage reaches the third voltage threshold.

After the control chip receives the overvoltage signal, the driver circuit 40 is turned off so that the surge signal does not enter a power device and thus does not damage the power device.

In the example, the control circuit 80 and the first protection circuit 50 are provided. The first protection circuit 50 suppresses the surge signal in the pre-stage of the rectifier circuit 30. The control circuit 80 detects the bus voltage of the direct current bus and controls the driver circuit 40 to be disconnected from the direct current bus when detecting the bus voltage has a surge voltage. Thus the surge voltage cannot enter the driver circuit 40 and devices in the post-stage, forming the overvoltage protection for the power tool.

It is to be noted that the above are merely preferred examples of the present disclosure and technical principles used therein. It is to be understood by those skilled in the art that the present disclosure is not limited to the preceding examples. Those skilled in the art can make various apparent modifications, adaptations, and substitutions without departing from the scope of the present disclosure. Therefore, while the present disclosure has been described in detail through the preceding examples, the present disclosure is not limited to the preceding examples and may include more other equivalent examples without departing from the concept of the present disclosure. The scope of the present disclosure is determined by the scope of the appended claims.

What is claimed is:
1. A power tool, comprising:
   a motor configured to drive a functional part to rotate;
   a rectifier circuit, wherein an input terminal of the rectifier circuit is connected to a power module and an output terminal of the rectifier circuit is connected to a direct current bus;
   a driver circuit, wherein an input terminal of the driver circuit is connected to the direct current bus and an output terminal of the driver circuit is connected to the motor;
   a bus capacitor connected between a high voltage terminal and a low voltage terminal of the direct current bus;
   a first protection circuit connected to the input terminal of the rectifier circuit, wherein the first protection circuit is configured to absorb an overvoltage signal on an input side of the rectifier circuit in response to an input voltage of the rectifier circuit being greater than or equal to a first voltage threshold; and
   a second protection circuit comprising a voltage comparison module, a switching module, and a voltage absorption module, a first input terminal of the voltage comparison module is connected to a first terminal of the bus capacitor, a second input terminal of the voltage comparison module is connected to a reference voltage, an output terminal of the voltage comparison module is connected to a control terminal of the switching module, a first electrode of the switching module is connected to a first terminal of the voltage absorption module, a second electrode of the switching module is connected to the reference voltage, and the second protection circuit is configured to start operation in response to a bus voltage of the direct current bus being greater than or equal to a second voltage threshold so as to absorb an overvoltage signal of the direct current bus, and wherein the first input terminal of the voltage comparison module is connected to a voltage dividing module, the voltage dividing module comprises an input terminal, a first voltage dividing output terminal, and a second voltage dividing output terminal, the input terminal of the voltage dividing module is connected to the first terminal of the bus capacitor, the first voltage dividing output terminal is connected to the first input terminal of the voltage comparison module, and the second voltage dividing output terminal outputs the reference voltage.

2. The power tool of claim 1, wherein the voltage dividing module comprises a first resistor and a second resistor, a first terminal of the first resistor is used as the input terminal of the voltage dividing module, a second terminal of the first resistor is used as the first voltage dividing output terminal of the voltage dividing module, the second terminal of the first resistor is connected to a first terminal of the second resistor, and a second terminal of the second resistor is used as the second voltage dividing output terminal of the voltage dividing module.

3. The power tool of claim 1, wherein the voltage absorption module is a first varistor.

4. The power tool of claim 1, wherein the voltage absorption module is an electrolytic capacitor, an anode of the electrolytic capacitor is used as the second terminal of the voltage absorption module, and a cathode of the electrolytic capacitor is used as the first terminal of the voltage absorption module.

5. The power tool of claim 1, further comprising a current limiter module, wherein the current limiter module is connected in series between a power module and a corresponding input terminal of the rectifier circuit.

6. The power tool of claim 5, wherein the current limiter module is a negative temperature coefficient thermistor.

7. The power tool of claim 1, wherein the first protection circuit is a second varistor, the voltage absorption module is a first varistor, and a varistor voltage of the first varistor is less than a varistor voltage of the second varistor.

8. The power tool of claim 1, wherein the second protection circuit comprises a voltage comparison module, a switching module, and a voltage absorption module, the voltage comparison module is configured to collect the bus voltage of the direct current bus and detect whether the bus voltage exceeds the second voltage threshold, the switching module is configured to switch to an on state when the bus voltage exceeds the second voltage threshold, and the voltage absorption module is connected to the switching module to start absorbing the overvoltage signal on the direct current bus when the switching module is in the on state.

9. A power tool, comprising:
a motor configured to drive a functional part to rotate;
a rectifier circuit, wherein an input terminal of the rectifier circuit is connected to a power module and an output terminal of the rectifier circuit is connected to a direct current bus;
a driver circuit, wherein an input terminal of the driver circuit is connected to the direct current bus and an output terminal of the driver circuit is connected to the motor; and
a first protection circuit connected the input terminal of the rectifier circuit, wherein the first protection circuit is configured to absorb an overvoltage signal on an input side of the rectifier circuit in response to an input voltage of the rectifier circuit being greater than or equal to a first voltage threshold, a second protection circuit comprising a voltage comparison module, a switching module, and a voltage absorption module, a first input terminal of the voltage comparison module is connected to a first terminal of thea bus capacitor, a second input terminal of the voltage comparison module is connected to a reference voltage, an output terminal of the voltage comparison module is connected to a control terminal of the switching module, a first electrode of the switching module is connected to a first terminal of the voltage absorption module, a second electrode of the switching module is connected to the reference voltage, and
wherein the first input terminal of the voltage comparison module is connected to a voltage dividing module, the voltage dividing module comprises an input terminal, a first voltage dividing output terminal, and a second voltage dividing output terminal, the input terminal of the voltage dividing module is connected to the first terminal of the bus capacitor, the first voltage dividing output terminal is connected to the first input terminal of the voltage comparison module, and the second voltage dividing output terminal outputs the reference voltage.

10. The power tool of claim 9, wherein the first protection circuit is a varistor.

11. The power tool of claim 9, further comprising a control circuit connected to the direct current bus and the control circuit is configured to turn off the driver circuit in response to the bus voltage of the direct current bus being greater than or equal to a third voltage threshold.

12. The power tool of claim 11, wherein the bus capacitor is connected between a high voltage terminal and a low voltage terminal of the direct current bus, wherein the control circuit is connected to the bus capacitor.

13. A power tool, comprising:
a motor configured to drive a functional part to rotate;
a rectifier circuit, wherein an input terminal of the rectifier circuit is connected to a power module and an output terminal of the rectifier circuit is connected to a direct current bus;
a driver circuit, wherein an input terminal of the driver circuit is connected to the direct current bus and an output terminal of the driver circuit is connected to the motor;
a first protection circuit connected the input terminal of the rectifier circuit, wherein the first protection circuit is configured to absorb an overvoltage signal on an input side of the rectifier circuit in response to an input voltage of the rectifier circuit being greater than or equal to a first voltage threshold; and
a current limiter module connected in series between the power module and the input terminal of the rectifier circuit, wherein the current limiter module is configured to suppress a surge current when the power tool is started,
a second protection circuit comprising a voltage comparison module, a switching module, and a voltage absorption module, a first input terminal of the voltage comparison module is connected to a first terminal of a bus capacitor, a second input terminal of the voltage comparison module is connected to a reference voltage, an output terminal of the voltage comparison module is connected to a control terminal of the switching module, a first electrode of the switching module is connected to a first terminal of the voltage absorption module, a second electrode of the switching module is connected to the reference voltage, and wherein the first input terminal of the voltage comparison module is connected to a voltage dividing module, the voltage dividing module comprises an input terminal, a first voltage dividing output terminal, and a second voltage dividing output terminal, the input terminal of the voltage dividing module is connected to the first terminal of the bus capacitor, the first voltage dividing output terminal is connected to the first input terminal of the voltage comparison module, and the second voltage dividing output terminal outputs the reference voltage.

14. The power tool of claim 13, wherein the first protection circuit is a varistor.

15. The power tool of claim 13, wherein the current limiter module is a negative temperature coefficient thermistor.

* * * * *